United States Patent
Torgerud et al.

(10) Patent No.: US 10,697,410 B1
(45) Date of Patent: Jun. 30, 2020

(54) MARINE PROPULSION SYSTEMS AND FUEL FILTERS FOR MARINE PROPULSION SYSTEMS

(71) Applicant: Brunswick Corporation, Mettawa, IL (US)

(72) Inventors: Michael A. Torgerud, Mount Calvary, WI (US); Pankaj Ankush Jagadale, Fond du Lac, WI (US); Amir Abou-Zeid, Waupun, WI (US); Ronald M. Holinka, Chilton, WI (US)

(73) Assignee: Brunswick Corporation, Mettawa, IL (US)

( * ) Notice: Subject to any disclaimer, the term of this patent is extended or adjusted under 35 U.S.C. 154(b) by 121 days.

(21) Appl. No.: 15/975,149

(22) Filed: May 9, 2018

(51) Int. Cl.
| | |
|---|---|
| *F02M 37/24* | (2019.01) |
| *F02M 37/14* | (2006.01) |
| *B01D 35/26* | (2006.01) |
| *B01D 35/30* | (2006.01) |
| *F02M 37/26* | (2019.01) |
| *F02M 37/28* | (2019.01) |
| *B01D 36/00* | (2006.01) |
| *F02M 37/44* | (2019.01) |

(52) U.S. Cl.
CPC ............. *F02M 37/24* (2019.01); *B01D 35/26* (2013.01); *B01D 35/30* (2013.01); *B01D 36/003* (2013.01); *B01D 36/005* (2013.01); *F02M 37/14* (2013.01); *F02M 37/26* (2019.01); *F02M 37/28* (2019.01); *B01D 2201/301* (2013.01); *F02M 37/44* (2019.01)

(58) Field of Classification Search
CPC ........ F02M 37/24; F02M 37/26; F02M 37/28; B01D 36/003; B01D 36/005
See application file for complete search history.

(56) References Cited

U.S. PATENT DOCUMENTS

| | | | | |
|---|---|---|---|---|
| 1,822,006 | A | * 9/1931 | Bull | .................. B01D 21/0012 |
| | | | | 210/304 |
| 2,156,329 | A | * 5/1939 | Beck | ..................... B01D 27/02 |
| | | | | 210/306 |

(Continued)

FOREIGN PATENT DOCUMENTS

FR    2829703    3/2003

OTHER PUBLICATIONS

Unpublished U.S. Appl. No. 15/432,010, filed Feb. 14, 2017.

*Primary Examiner* — Kevin R Steckbauer
(74) *Attorney, Agent, or Firm* — Andrus Intellectual Property Law, LLP (57) ABSTRACT

A marine propulsion system includes an internal combustion engine; a fuel reservoir; a pump that pumps fuel from the fuel reservoir to the internal combustion engine; and a fuel filter that filters the fuel. The fuel filter includes a canister and a fuel inlet that conveys the fuel adjacent to cylindrical sidewalls of the canister so that the fuel immediately spirally flows around and down the cylindrical sidewalls under centrifugal force and under force of gravity, and then is drawn radially inwardly through a filter element by the pump. A fuel outlet extends at least partially along a center axis of the canister and discharges the fuel from the canister. A drain is located at the bottom of the canister and configured to drain water that separates from the fuel as the fuel flows around and down the cylindrical sidewalls.

18 Claims, 7 Drawing Sheets

(56) References Cited

U.S. PATENT DOCUMENTS

| | | | | |
|---|---|---|---|---|
| 3,078,650 | A * | 2/1963 | Anderson | B01D 46/2411 55/337 |
| 3,272,336 | A * | 9/1966 | Humbert, Jr. | B01D 27/144 210/132 |
| 3,508,383 | A * | 4/1970 | Buonpastore | B01D 50/002 55/337 |
| 3,568,835 | A | 3/1971 | Hansen | |
| 3,637,078 | A * | 1/1972 | Hollar | B01D 27/08 210/767 |
| 3,726,403 | A * | 4/1973 | Shaltis | B01D 17/10 210/132 |
| 3,883,332 | A * | 5/1975 | Llewelyn | B04C 5/13 55/459.5 |
| 3,931,011 | A * | 1/1976 | Richards | B01D 17/0214 210/136 |
| 4,011,068 | A * | 3/1977 | Llewelyn | B01D 45/12 55/459.5 |
| 4,502,954 | A * | 3/1985 | Druffel | B01D 17/00 210/136 |
| 4,668,393 | A * | 5/1987 | Stone | B01D 17/00 210/304 |
| 4,683,055 | A | 7/1987 | Bosch et al. | |
| 4,780,203 | A * | 10/1988 | Barcy | B01D 17/0208 210/304 |
| 4,933,093 | A | 6/1990 | Keller | |
| 5,103,793 | A | 4/1992 | Riese et al. | |
| 5,143,608 | A | 9/1992 | Marshall, Sr. | |
| 5,192,425 | A * | 3/1993 | Cyphers | B01D 29/15 210/133 |
| 5,231,967 | A * | 8/1993 | Baltz | F02M 37/08 123/497 |
| 5,264,121 | A * | 11/1993 | Guzman-Sanchez | B01D 21/009 210/117 |
| 5,322,624 | A * | 6/1994 | Rogers | F02M 37/24 210/232 |
| 5,637,215 | A * | 6/1997 | Albers, Jr. | B01D 17/10 210/305 |
| 5,938,921 | A * | 8/1999 | Janik | B01D 36/003 210/304 |
| 6,258,269 | B1 * | 7/2001 | Knight | B01D 35/16 210/248 |
| 6,440,317 | B1 | 8/2002 | Koethe | |
| 7,112,110 | B1 * | 9/2006 | Kollmann | F02M 37/0088 440/88 F |
| 8,651,068 | B1 | 2/2014 | Torgerud et al. | |
| 9,481,175 | B2 | 11/2016 | Arima et al. | |
| 9,527,018 | B2 * | 12/2016 | Morris | B01D 36/006 |
| 9,631,590 | B2 * | 4/2017 | Girondi | B01D 36/006 |
| 9,789,426 | B2 | 10/2017 | Morris et al. | |
| 9,950,287 | B2 * | 4/2018 | Klein | B01D 35/005 |
| 10,087,900 | B2 * | 10/2018 | Loesing | B01D 36/001 |
| 2009/0288998 | A1 | 11/2009 | Jaeger et al. | |
| 2010/0117842 | A1 * | 5/2010 | Fachidis | B01D 35/143 340/618 |
| 2012/0080372 | A1 | 4/2012 | Ries et al. | |
| 2014/0353236 | A1 * | 12/2014 | Klein | B01D 35/005 |
| 2015/0059584 | A1 * | 3/2015 | Steins | B01D 46/0005 96/417 |
| 2015/0267658 | A1 * | 9/2015 | Girondi | B01D 36/006 210/437 |
| 2015/0273370 | A1 * | 10/2015 | Morris | B01D 45/14 210/322 |
| 2016/0082369 | A1 * | 3/2016 | Morris | B01D 35/005 210/799 |
| 2017/0120168 | A1 * | 5/2017 | Stamey, Jr. | B01D 36/005 |
| 2019/0217229 | A1 * | 7/2019 | Rookey | B01D 29/21 |

\* cited by examiner

MARINE PROPULSION SYSTEMS AND FUEL FILTERS FOR MARINE PROPULSION SYSTEMS

FIELD

The present disclosure relates to marine propulsion systems and particularly to fuel filters for marine propulsion systems that promote fuel water separation.

BACKGROUND

The following U.S. Patents are incorporated herein by reference in entirety:

U.S. Pat. No. 8,651,068 discloses a device for separating water and contaminants from fuel that is being supplied from an upstream fuel reservoir to a downstream internal combustion engine. The device comprises a housing configured to couple with the upstream fuel reservoir, the housing having an inlet receiving fuel, water and contaminants, and an outlet discharging the fuel; a gravity separator disposed in the housing between the inlet and the outlet, the gravity separator separating the water from the fuel; and a filter disposed in the housing between the inlet and the outlet, the filter filtering the contaminants from the fuel.

U.S. Pat. No. 9,482,175 discloses a system for providing fuel to an internal combustion engine which comprises a fuel reservoir for containing fuel for use by the internal combustion engine; a first pump that pumps fuel from a supply tank into the fuel reservoir; and a battery that provides electrical power to the first pump. A control circuit sends signals to selectively run the first pump so as both to minimize a total amount of electrical power consumed by the system and to maintain at least a minimum amount of fuel in the reservoir. Methods for filling a fuel reservoir that contains fuel for use by an internal combustion engine are also provided.

U.S. Patent Publication No. 2009/0288998 discloses a water-separating fuel filter provided with a sensor at its bottom portion which is not removable in a direction away from the housing structure of the filter mechanism. In other words, if the sensor is removable at all, it must be removed in a direction which requires the sensor to move through the cavity of the housing structure of the filter while preventing an internal end of the sensor from passing in a direction away from the cavity and through a portion of the wall of the housing structure through which the sensor extends during operation. This eliminates the likelihood of a sensor being inadvertently removed from the housing structure and not properly replaced prior to subsequent operation of a fuel system of an internal combustion engine. This, in turn, prevents the condition wherein an opening at the bottom portion of the fuel filter housing structure can allow liquid fuel to flow from the fuel system into the bilge of a watercraft.

U.S. Pat. No. 5,103,793 discloses a vapor separator assembly for an internal combustion engine which includes a bowl member and a cover member. A fuel pump is located in the internal cavity of the bowl member and has its inlet located in the lower portion of the bowl member cavity, for supplying fuel thereto. The fuel pump is secured in position within the bowl member by engagement of the cover member with the fuel pump. The cover member includes a mounting portion for mounting a water-separating filter element to the vapor separator assembly. The cover member includes structure for routing fuel from the discharge of the water separating filter element to the interior of the bowl member internal cavity. A compact arrangement is thus provided for the vapor separator, the fuel pump and the water separating filter, eliminating a number of hose connections between such components as well as facilitating assembly to the engine.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

A marine propulsion system comprises an internal combustion engine; a fuel reservoir; a pump that pumps the fuel from the fuel reservoir to the internal combustion engine; and a fuel filter that filters fuel from the fuel reservoir. The fuel filter comprises a canister that extends from top to bottom along a center axis and has a cylindrical sidewall that is radially spaced apart from the center axis. A filter element is radially disposed between the cylindrical sidewall and the center axis. A fuel inlet extends transverse to the center axis and conveys the fuel into the canister adjacent to the cylindrical sidewall so that as the fuel enters the canister the fuel immediately spirally flows around and down the cylindrical sidewall under centripetal force and under force of gravity and then is drawn radially inwardly by the pump through the filter element towards the center axis. A fuel outlet that extends at least partially along the center axis and discharges the fuel from the canister and a drain is located at the bottom of the canister and configured to drain water that separates from the fuel as the fuel flows around and down the cylindrical sidewall.

BRIEF DESCRIPTION OF THE DRAWINGS

The present disclosure is described with reference to the following Figures. The same numbers are used throughout the Figures to reference like features and like components.

DETAILED DESCRIPTION OF THE DRAWINGS

Figure 1:
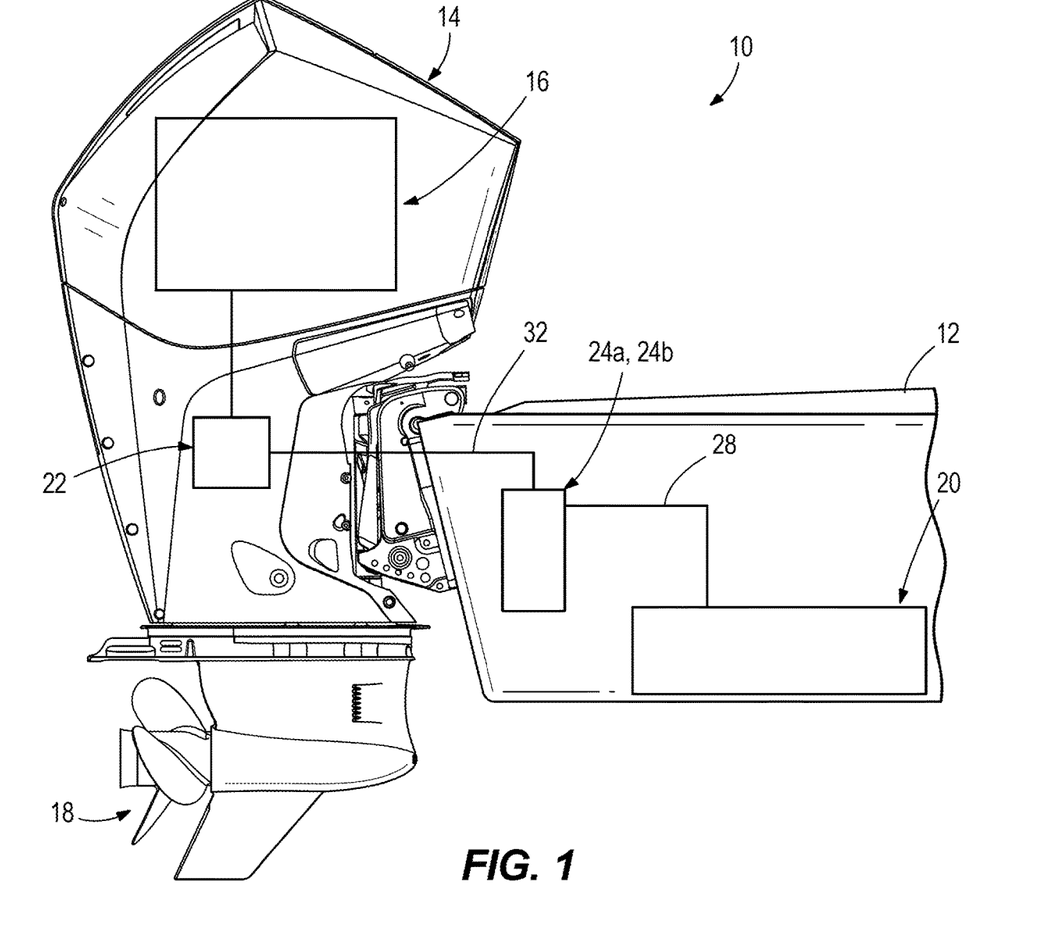
FIG. 1 depicts a marine propulsion system for propelling a marine vessel in water.

FIG. 1 depicts a marine propulsion system 10 for propelling a marine vessel 12 in water. The marine propulsion system 10 includes a marine drive 14, which in the illustrated example is an outboard motor. It should be noted that the particular marine drive shown in the drawings is not intended to be limiting, and the concepts of the present disclosure are applicable with other types of marine drives including for example a stern drive, inboard drive, pod drive, and/or the like. The marine drive 14 has an internal combustion engine 16 that powers a propulsor 18 so as to generate thrust forces that propel the marine vessel 12, all as conventional. In illustrated example, the propulsor 18 includes a propeller, however other configurations could be used, for example more than one propeller, counter-rotating propellers, one or more impellers, and/or the like. The internal combustion engine 16 is supplied with fuel from a fuel reservoir 20, which can for example be located on the marine vessel 12 or with the marine drive 14. In the illustrated example, the fuel reservoir 20 is located on the marine vessel 12. A fuel pump 22 is also located either on the marine vessel 12 or with the marine drive 14 and is configured to draw the fuel from the fuel reservoir 20 and pump the fuel to the internal combustion engine 16, all as is conventional.

Referring to FIGS. 1-4, the marine propulsion system 10 also includes a fuel filter 24a, which is a particular focus of the present disclosure. The fuel filter 24a can be configured for mounting to the marine vessel 12, as shown in FIGS. 1-4. Alternately, the fuel filter 24a can be configured for mounting to the marine drive 14. The concepts of the present disclosure are applicable to either type of arrangement. The fuel filter 24a has a fuel inlet 26 that is connected to an upstream fuel line 28 coupled between the fuel reservoir 20 and the fuel filter 24a. The fuel filter 24a also has a fuel outlet 30 that connected to a downstream fuel line 32 coupled between the fuel filter 24a and the internal combustion engine 16. The upstream fuel line 28 and downstream fuel lines 32 can have direct connections to the respective components, or can be indirectly connected via intermediate components and/or connectors.

Through research and development, the present inventors have determined that conventional fuel filter configurations for marine vessels often include restrictive flow paths, which can cause vapor formation that decreases pumping capability, especially during hot conditions. Presence of water in fuel poses durability issues for fuel systems. Further, a water-in-fuel sensor alarm is usually needed however conventional systems do not allow for installation within marine vessels having inboard engines or engine-powered electric generators.

Figure 3:
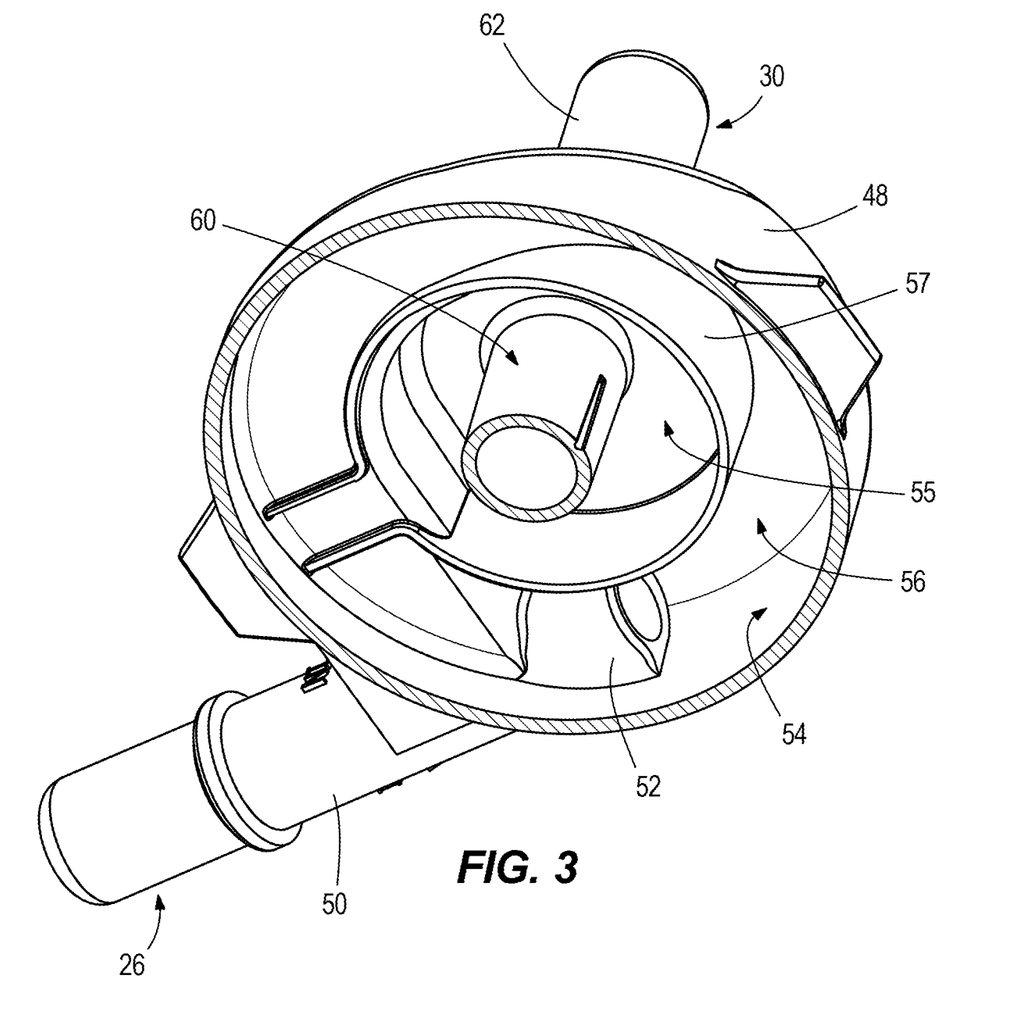
FIG. 3 is a view of section 3-3, taken in FIG. 2.
Figure 4:
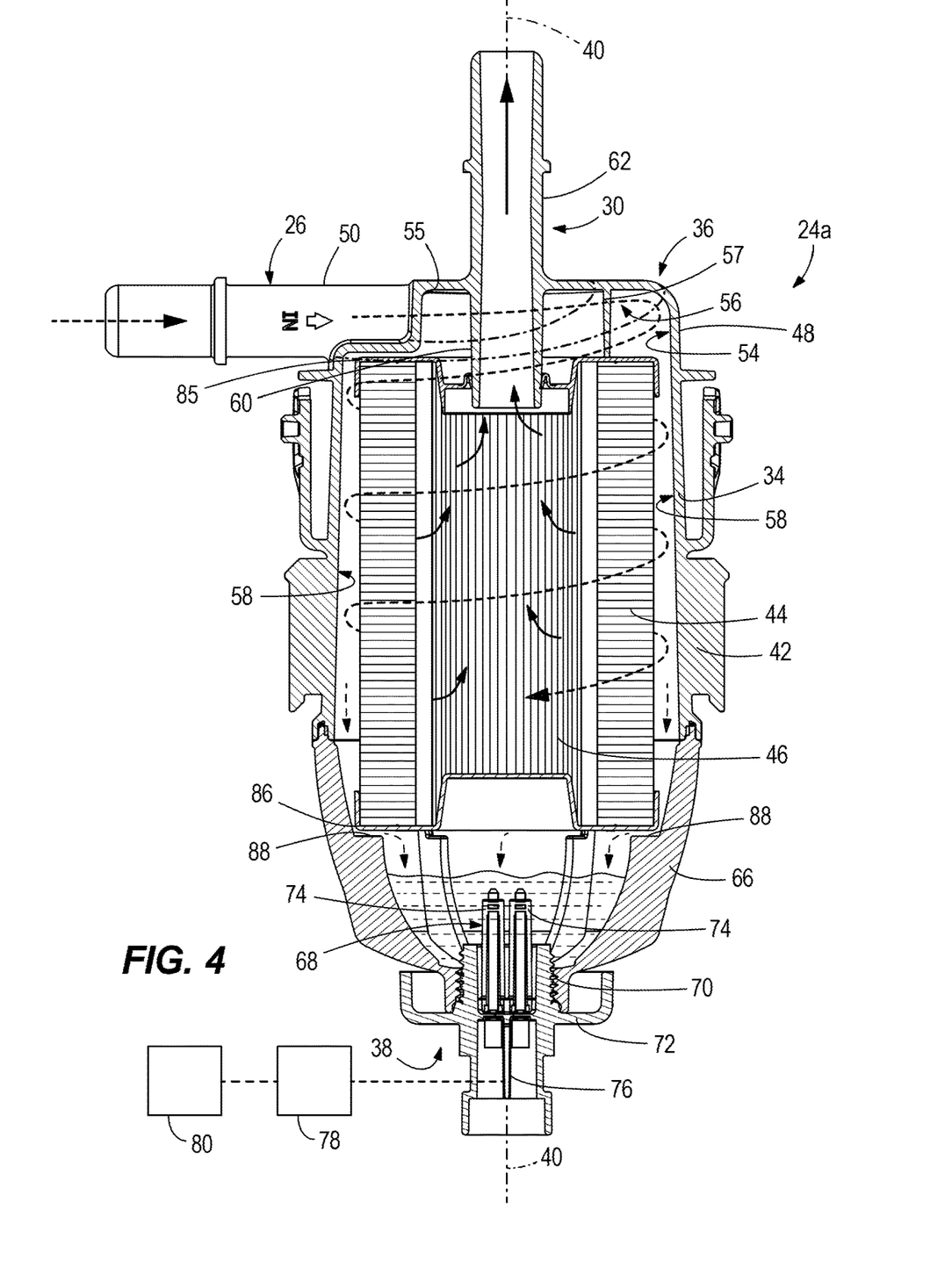
FIG. 4 is a view of section 4-4, taken in FIG. 2.

Referring to FIGS. 3 and 4, the fuel filter 24a has a canister 34 that extends from top 36 to bottom 38 along a center axis 40. The canister 34 has a cylindrical sidewall 42 that is radially spaced apart from the center axis 40. A filter element 44 is disposed in the canister 34, and radially extends from the center axis towards the cylindrical sidewall 42. The type and configuration of the filter element 44 can vary from what is shown. In the illustrated example, the filter element 44 is a pleated filter media having vertical pleats 46 that are fanned out around the inner diameter of the canister 34. The fuel filter 24a also has a top cap 48, which can be integral with or connected to the canister 34. As shown in the figures, the fuel inlet 26 and the fuel outlet 30 are formed through the top cap 48. The fuel inlet 26 extends transverse to the center axis 40 and is positioned so that it conveys the fuel from the upstream fuel line 28 into the canister 34, adjacent to the cylindrical sidewall 42. The fuel inlet 26 has an outer stem 50 that laterally extends from the outside of the top cap 48 and an inner stem 52 that laterally extends into the top cap 48 and is disposed alongside the inner radial surface 54 of the top cap 48. The top cap 48 includes a ramp surface 56 that gradually guides the fuel from the inner stem 52 downwardly with respect to the inner radial surface 54 of the top cap 48, and so that the fuel flows down the inner radial surface 58 of the cylindrical sidewall 42, as shown by dashed-line arrows in FIG. 4. The ramp surface 56 is formed in the interior bottom surface 55 of the top cap 48, axially above the inner stem 52 of the fuel inlet 26. The ramp surface 56 extends along a perimeter of the interior bottom surface 55 of the top cap 48 to gradually guide the fuel with minimal restriction into the flow pattern shown in FIG. 4. An internal ring wall 57 axially protrudes downwardly from the interior bottom surface 55 of the top cap 48 and is radially spaced inwardly from the inner radial surface 54 of the top cap 48. Together, the inner radial surface 54, ramp surface 56 and internal ring wall 57 define a channel that gently guides the fuel flow into the flow pattern shown in FIG. 4, which is a downward spiral flow along the cylindrical sidewall 42.

The fuel outlet 30 extends along the center axis 40 and discharges fuel from the center of the filter element 44 and the center of the canister 34 to the downstream fuel line 32 shown in FIG. 1. The fuel outlet 30 has an inner stem 60 that protrudes from the center of the top cap 48, within the internal ring wall 57, towards and optionally into the filter element 44. The fuel outlet 30 also has an outer stem 62 that axially extends from the center of the outer top surface 64 of the top cap 48 and is coupled to the downstream fuel line 32.

The fuel filter 24a also has a lower bowl 66 coupled to the cylindrical sidewall 42. Together, the lower bowl 66, canister 34 and top cap 48 define the interior of the fuel filter 24a. A convention water-in-fuel sensor 68 is connected to the fuel filter 24a via threaded connection 70 with the lower bowl 66. The type and configuration of the water-in-fuel sensor can vary from what is shown. One suitable commercially-available example is available for purchase from Mercury Marine, part no. 8M0135386. In the illustrated example, the water-in-fuel sensor 68 has a retainer bracket 72 having threads that engage with internal threads formed in a through bore in the bottom of the lower bowl 66. The water-in-fuel sensor 68 further has a pair of probes 74 that extend into the interior of the fuel filter 24a and are configured to sense the presence of water in the lower bowl 66 in a conventional manner. The water-in-fuel sensor 68 is connected by a wired connector 76 to a computer controller 78, which is programmed to automatically actuate an indicator device 80 when the water-in-fuel sensor 68 senses a predetermined amount of water in the lower bowl 66, for alerting the operator that water needs to be drained from the lower bowl 66. Manual removal of the retainer bracket 72 from the lower bowl 66 allows the water to drain from the lower bowl 66, as is conventional. In other examples, the lower bowl 66 includes one or more removable drain plugs for draining the water.

As mentioned above, the construction of the filter element 44 can vary from what is shown. In the illustrated example, the filter element 44 is a pleated filter media having a top retainer cap 85 that is radially fit onto the inner stem 60 of the top cap 48 in a press-fit connection and a bottom retainer cap 86 that is located near inner perimeter shoulder 88 formed in the lower bowl 66.

Through research and experimentation, the present inventors have determined that the fuel filter 24a shown in the figures advantageously promotes improved separation of water from the fuel compared to prior art arrangements. The fuel filter 24a causes the fuel to immediately spirally flow around and down the cylindrical sidewall, which causes separation of water from the fuel via centripetal forces and the force of gravity. The fuel pump 22 connected to the downstream fuel line 32 creates a vacuum force that draws the fuel towards the fuel outlet 30 at the center of the fuel filter 24a, as shown by solid line arrows in FIG. 4, while the water that has been separated from the fuel drains down the cylindrical sidewall 42 to the lower bowl 66, for subsequent draining by the operator. The flow path for the fuel provides a relatively low amount of restriction on the flow of fuel as compared to prior art arrangements, thus discouraging vapor separation and facilitating improved fuel-water separation.

The differences in mass properties of the fuel and water facilitate the separation. More specifically, two functional mass separation techniques are employed by the improved fuel filter of the present disclosure. First, the fuel/water combination entering the fuel inlet in the upper portion of the fuel filter travels in a circular motion, which causes the water, which has a higher density than the fuel, to be pulled outward. As the mixture travels down the fuel filter in the spiral path shown in FIG. 4, the mixture enters a secondary, larger volume/low velocity stage of separation. In this larger volume, further water separation occurs when velocity and turbulence are reduced and gravitational forces enable the water to descend and collect in the lowest region of the fuel filter. The tangential flow geometry at the fuel inlet advantageously avoids direct spray of high velocity fuel/water mixture. The reduced velocity at the lower regions of the fuel filter advantageously allows the water, which is heavier than the fuel, to separate without impingement on the filtration process, as the fuel is pulled by the pump into the filter media. The centrally located fuel outlet also provides a reduced pressure drop in comparison to the prior art, further enhancing pumping efficiency of the system.

Figure 2:
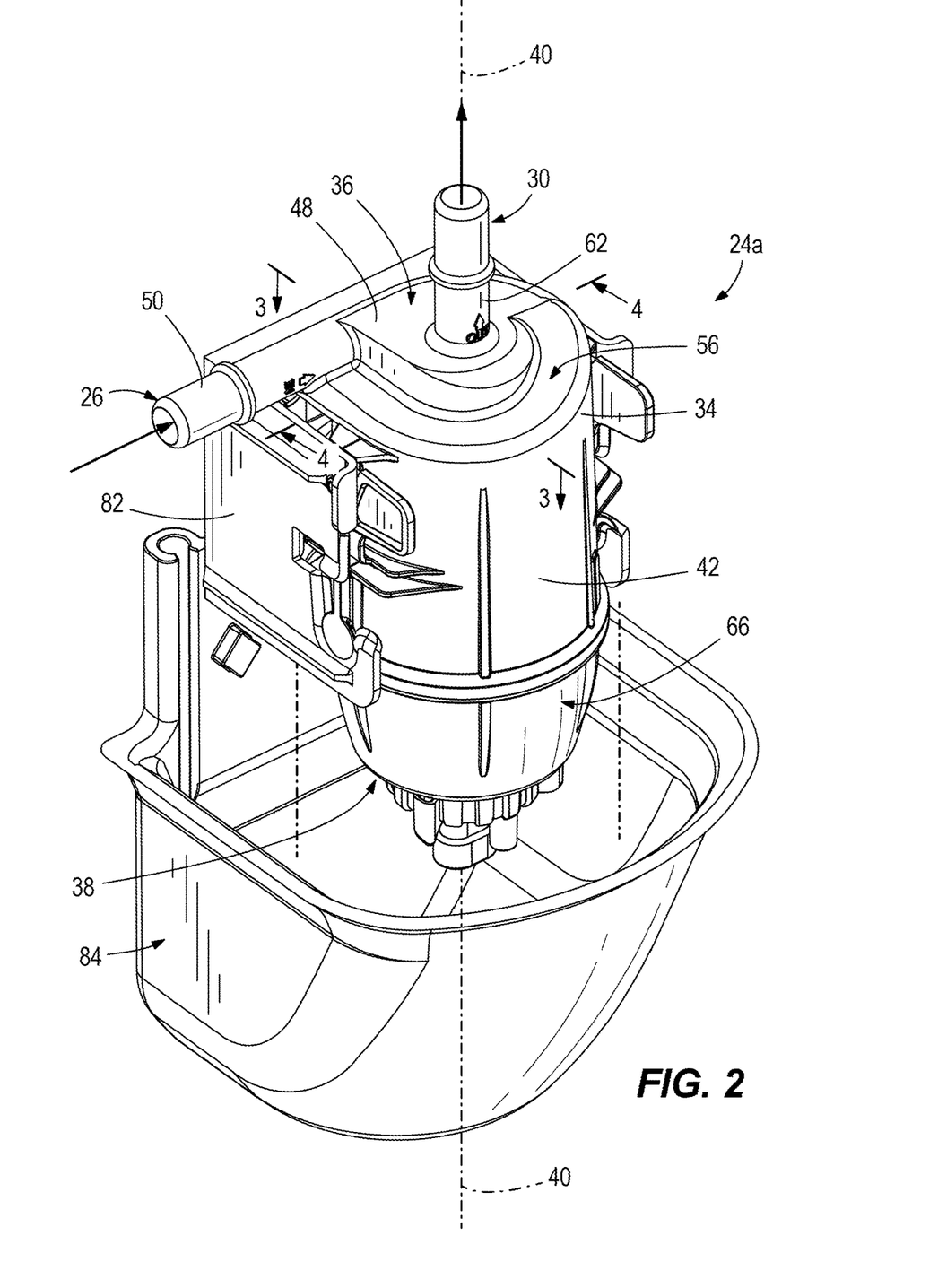
FIG. 2 depicts a first example of a fuel filter that filters fuel for the marine propulsion system.

Referring to FIG. 2, optionally the fuel filter 24a can be coupled to the marine vessel 12 by a mounting bracket 82. A fire shield 84 can be coupled to the mounting bracket 82, fuel filter 24a, and/or marine vessel 12 for shielding the water-in-fuel sensor 68 and fuel filter 24a from fire that might occur.

Figure 5:
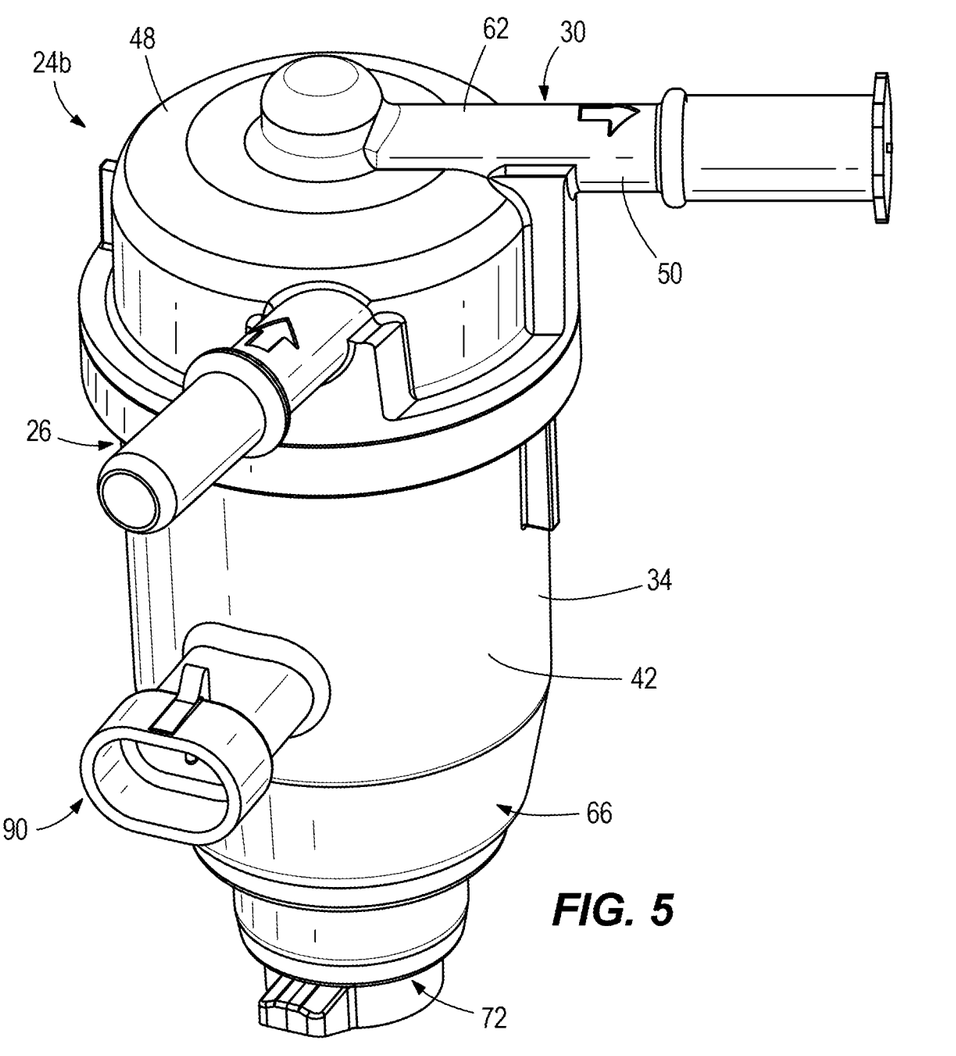
FIG. 5 depicts a second example of a fuel filter that filters fuel for the marine propulsion system.

FIG. 5 depicts a second embodiment of the fuel filter, designated 24b. Similar features are given the same reference numbers applied to the first embodiment of the fuel filter 24a, shown in FIGS. 1-4. The fuel filter 24b differs from the fuel filter 24a in that the outer stem 62 extends laterally from the top cap 48, perpendicularly to the center axis 40. A wire harness 90 laterally extends from the canister 34 and is for connection of the water-in-fuel sensor 68 to the above-described computer controller 78. The lower bowl 66 is integrally formed with the cylindrical sidewall 42 and connected by a threaded connection to the top cap 48 such that the lower portions of the fuel filter, including the filter element, together provide a disposable combination that, once spent, is easily replaced by the operator.

Figure 6:
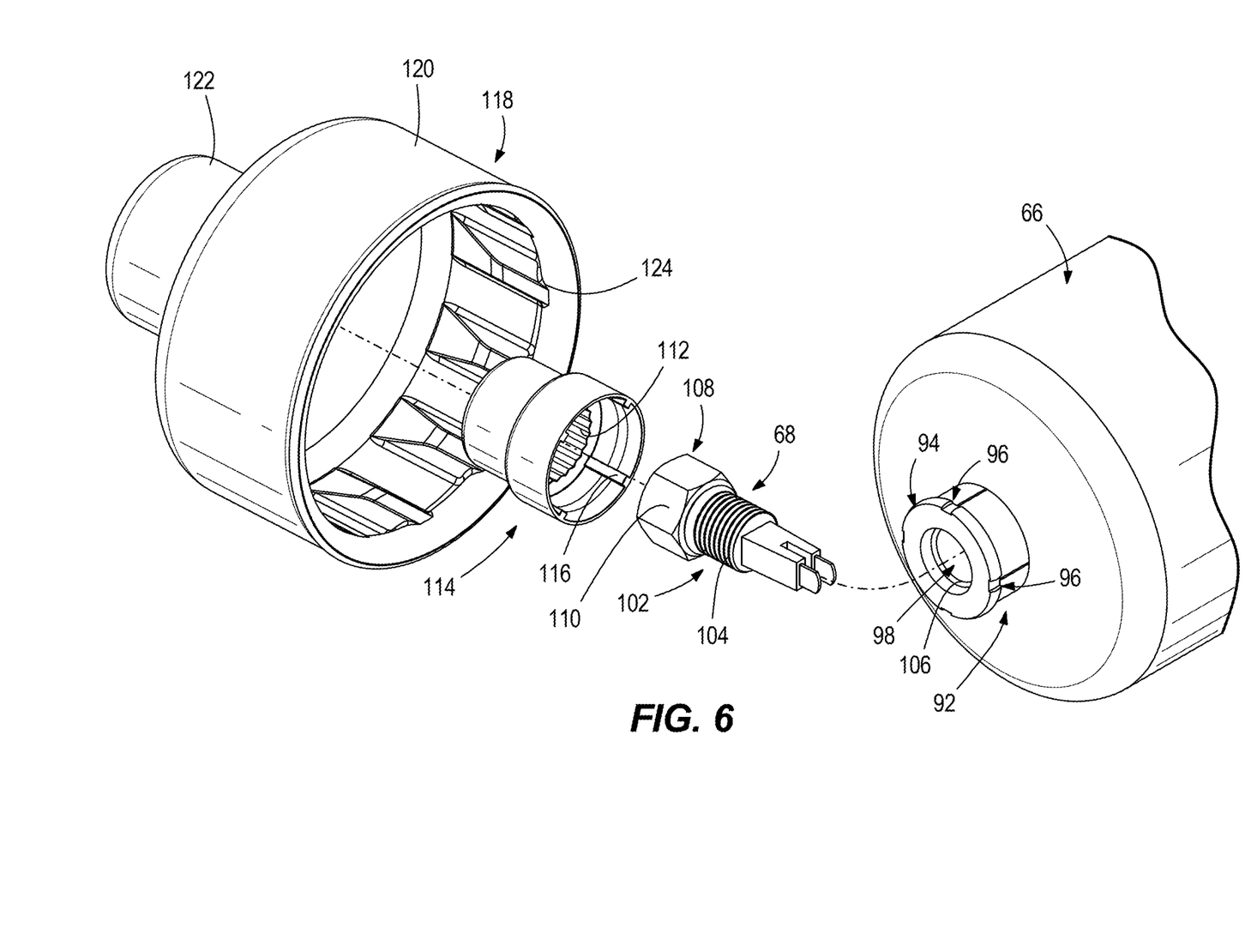
FIG. 6 depicts a third example of a fuel filter that filters fuel for the marine propulsion system.
Figure 7:
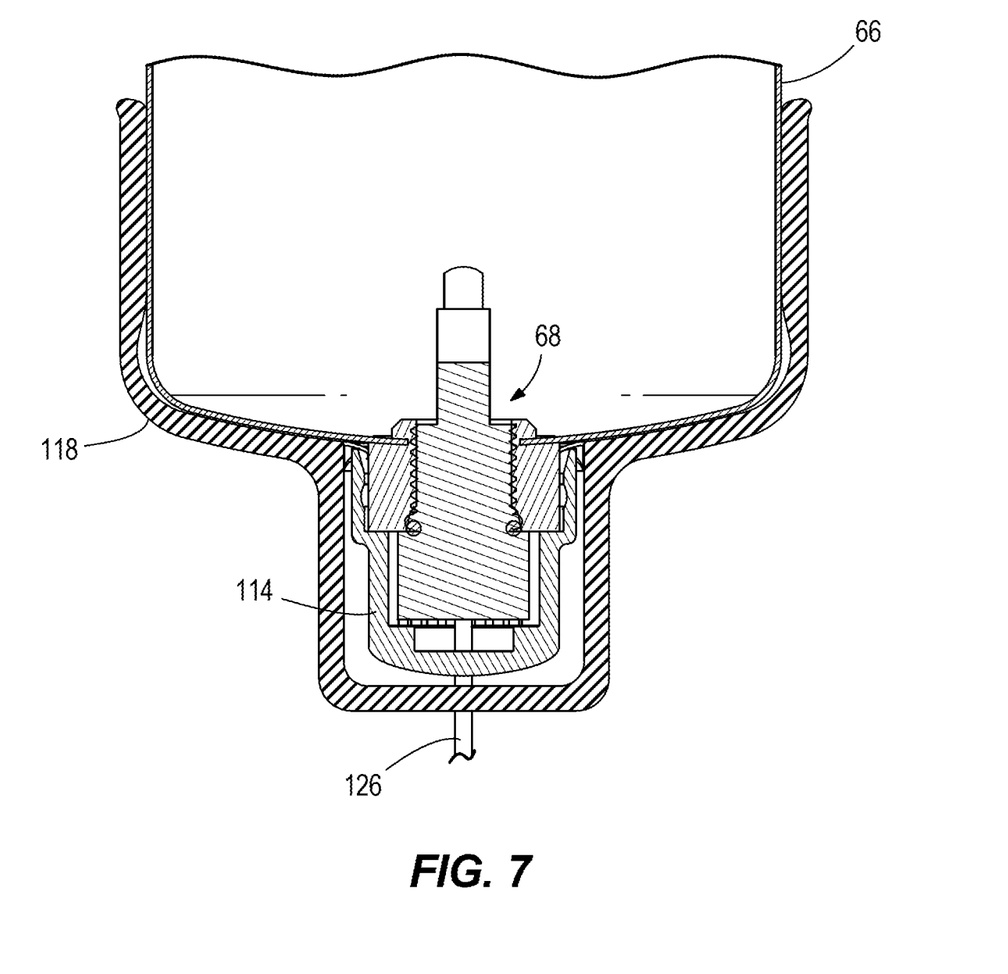
FIG. 7 is a sectional view of the third example in FIG. 6.

FIGS. 6-7 depict an embodiment of a lower bowl 66 and water-in-fuel sensor 68, which can be configured for use with the fuel filters 24a, 24b, or a conventional-style fuel filter. In this example, the lower bowl 66 has an outer stem 92 having a ring top 94 with a plurality of axial slots 96 that are spaced around its perimeter. The outer stem 92 further has a through-bore 98 that receives the water-in-fuel sensor 68 and is engaged therewith via a threaded connection. The water-in-fuel sensor 68 has a body portion 102 with outer threads 104 that engage with inner threads 106 in the through-bore 98. The body portion 102 has an end portion 108 with outer flats 110 that are engaged with inner engagement surfaces 112 of an end cap 114. The end cap 114 also has a plurality of axially-extending ridges 116 that are spaced apart around an inner diameter of the end cap 114 and configured to engage with the axial slots 96 in the ring top 94 in a slotted connection, thus together with the inner engagement surfaces 112 engaged with the outer flats 110, locking the end cap 114 to the outer stem 92 of the lower bowl 66.

A flame-retardant elastomeric boot 118 is made of rubber or silicone and has an upper bowl portion 120 that fits over the lower bowl 66 and a lower bowl portion 122 that fits over the end cap 114. The inner surface of the upper bowl portion 120 has axially-extending ridges 124 are disposed on and are configured to grip against the outer surface of the lower bowl 66, thus facilitating engagement. The elastomeric boot 118 protects the fuel filter 24, including lower bowl 66 and water-in-fuel sensor 68 from fire that might occur around the fuel filter 24. An electrical wire 126 extends through the end cap 114 and elastomeric boot 118 and electrically connects the water-in-fuel sensor 68 to the above-described computer controller 78. The end cap 114 can be made of plastic and includes the above-described locking features, thus preventing rotation of the water-in-fuel sensor 68 with respect to the lower bowl 66, satisfying CFR requirements for water-in-fuel sensors on fuel filters. During installation, the water-in-fuel sensor 68 is engaged with the lower bowl 66 via the threaded connection by applying a prescribed torque, then the plastic end cap 114 is snapped over the water-in-fuel sensor 68 by aligning the ridges 116 on the inside of the end cap 114 with axial slots 96. Finally, the elastomeric boot 118 is pulled onto the lower bowl 66 until it bottoms out, as shown in FIG. 9. These steps are undertaken in the reverse order during disassembly.

In the present description, certain terms have been used for brevity, clarity and understanding. No unnecessary limitations are to be inferred therefrom beyond the requirement of the prior art because such terms are used for descriptive purposes only and are intended to be broadly construed.

What is claimed is:

1. A marine propulsion system for propelling a marine vessel in water, the marine propulsion system comprising:
   an internal combustion engine;
   a fuel reservoir;
   a pump that pumps fuel from the fuel reservoir to the internal combustion engine; and
   a fuel filter that filters the fuel from the fuel reservoir, the fuel filter comprising
      a canister that extends from top to bottom along a center axis and having a cylindrical sidewall that is radially spaced apart from the center axis;
      a filter element that is radially disposed between the cylindrical sidewall and the center axis; and
      a top cap enclosing the filter element in the canister and having an inner radial surface aligned with the cylindrical sidewall of the canister;
      a fuel inlet having an outer stem that conveys the fuel into the top cap and an inner stem that extends into the top cap directly adjacent to the inner radial surface, transverse to the center axis, and conveys the fuel into the canister directly adjacent to the inner radial surface so that as the fuel enters the top cap the fuel immediately spirally flows around and down the inner radial surface and then the cylindrical sidewall under centripetal force and under force of gravity and then is drawn radially inwardly by the pump through the filter element towards the center axis;
      a fuel outlet that extends at least partially along the center axis and discharges the fuel from the canister;
      wherein the canister is configured to drain water that separates from the fuel as the fuel flows around and down the inner radial surface and then the cylindrical sidewall.

2. The marine propulsion system according to claim 1, wherein the fuel filter further comprises a ramp surface that downwardly guides the fuel from the inner stem around and down the inner radial surface and cylindrical sidewall.

3. The marine propulsion system according to claim 2, wherein the ramp surface is located above the inner stem and cylindrical sidewall.

4. The marine propulsion system according to claim 1, wherein the filter element comprises a pleated filter media.

5. The marine propulsion system according to claim 1, wherein the canister and filter element are disposable.

6. The marine propulsion system according to claim 1, further comprising a controller and a water-in-fuel sensor that senses the water that separates from the fuel and communicates with the controller.

7. The marine propulsion system according to claim 6, wherein the water-in-fuel sensor is engaged with a lower bowl of the fuel filter.

8. The marine propulsion system according to claim 7, further comprising a cap that covers the water-in-fuel sensor and is engaged with the lower bowl via a locking connection.

9. The marine propulsion system according to claim 8, wherein the cap has an interior contour that engages with an exterior contour of the lower bowl to provide the locking connection.

10. The marine propulsion system according to claim 9, wherein the interior contour comprises a rib and the exterior contour comprises a slot that receives the rib to lock the cap with respect to the canister.

11. The marine propulsion system according to claim 8, further comprising a covering boot that is made of rubber and covers the cap that is coupled to the bottom of the canister.

12. The marine propulsion system according to claim 11, wherein the water-in-fuel sensor is coupled to the controller via electrical wires that extend through the cap and through the covering boot.

13. The marine propulsion system according to claim 1, wherein the fuel filter is configured for coupling to the marine vessel.

14. The marine propulsion system according to claim 1, wherein the fuel filter is configured for coupling to the internal combustion engine.

15. A fuel filter for a marine propulsion system for propelling a marine vessel in water, wherein the marine propulsion system comprises an internal combustion engine; a fuel reservoir; and a pump that pumps the fuel from the fuel reservoir to the internal combustion engine; the fuel filter configured to filter the fuel from the fuel reservoir and comprising:
    a canister that extends from top to bottom along a center axis and having a cylindrical sidewall that is radially spaced apart from the center axis;
    a filter element that is radially disposed between the cylindrical sidewall and the center axis;
    a top cap enclosing the filter element in the canister and having an inner radial surface aligned with the cylindrical sidewall of the canister;
    a fuel inlet having an outer stem that conveys the fuel into the top cap and an inner stem that extends into the top cap directly adjacent to the inner radial surface, transverse to the center axis, and conveys the fuel into the canister directly adjacent to the inner radial surface so that as the fuel enters the top cap the fuel immediately spirally flows around and down the inner radial surface and the cylindrical sidewall under centripetal force and under force of gravity and then is drawn radially inwardly by the pump through the filter element towards the center axis;
    a fuel outlet that extends at least partially along the center axis and discharges the fuel from the canister; and
    wherein the canister is configured to drain water that separates from the fuel as the fuel flows around and down the inner radial surface and then the cylindrical sidewall.

16. The fuel filter according to claim 15, further comprising a ramp surface that downwardly guides the fuel from the fuel inlet around and down the inner radial surface and cylindrical sidewall.

17. The fuel filter according to claim 16, wherein the ramp surface is located above the inner stem and cylindrical sidewall.

18. The fuel filter according to claim 15, wherein the canister and filter element are disposable.

* * * * *